US006976697B2

(12) United States Patent
Britton et al.

(10) Patent No.: US 6,976,697 B2
(45) Date of Patent: Dec. 20, 2005

(54) PASSENGER CARRIER FRAME (75) Inventors: Daniel William Britton, Calgary (CA); Imad Assaf, Calgary (CA)

(73) Assignee: 634182 Alberta Ltd., Calgary (CA)

( * ) Notice: Subject to any disclaimer, the term of this patent is extended or adjusted under 35 U.S.C. 154(b) by 0 days.

(21) Appl. No.: 10/249,897

(22) Filed: May 15, 2003

(65) Prior Publication Data

US 2004/0004340 A1    Jan. 8, 2004

Related U.S. Application Data

(60) Provisional application No. 60/380,268, filed on May 15, 2002.

(51) Int. Cl.[7] ............................. B62B 1/00; B62B 7/00; A47C 1/08
(52) U.S. Cl. ................... 280/647; 280/47.38; 280/642; 280/650; 297/256.16
(58) Field of Search .................. 280/638, 639, 280/642, 647, 641, 643, 648, 649, 650, 651, 280/655, 655.1, 656, 657, 658, 42, 62, 47.38, 280/47.34, 47.39, 204, 644, 30; 297/256.16, 297/255, 40, 16.2, 17, 42

(56) References Cited

U.S. PATENT DOCUMENTS

| | | | |
|---|---|---|---|
| 4,415,180 A | | 11/1983 | Payne, Jr. |
| 4,492,388 A | * | 1/1985 | de Wit ........................ 280/651 |
| 4,544,178 A | | 10/1985 | Al-Sheikh et al. |
| 4,892,327 A | * | 1/1990 | Cabagnero ................... 280/650 |
| 5,110,150 A | | 5/1992 | Chen |
| 5,421,603 A | * | 6/1995 | Wills et al. ................. 280/642 |
| 5,725,238 A | * | 3/1998 | Huang ........................ 280/642 |
| 5,823,564 A | * | 10/1998 | Kettler ....................... 280/642 |
| 5,876,046 A | * | 3/1999 | Courtney et al. ............. 280/30 |
| 5,984,332 A | | 11/1999 | Beaudoin et al. |
| 6,062,587 A | | 5/2000 | Cabagnero |
| 6,099,019 A | * | 8/2000 | Cheng ........................ 280/642 |
| 6,155,581 A | | 12/2000 | Beaudoin et al. |
| 6,179,321 B1 | | 1/2001 | Sun |
| 6,209,892 B1 | | 4/2001 | Schaaf et al. |
| 6,241,274 B1 | | 6/2001 | Huang |
| 6,325,406 B1 | | 12/2001 | O'Shea et al. |
| 6,378,892 B1 | * | 4/2002 | Hsia ........................... 280/650 |
| 6,626,451 B1 | * | 9/2003 | Song ........................... 280/642 |
| 6,698,788 B2 | * | 3/2004 | Yang .......................... 280/647 |
| 2002/0014758 A1 | | 2/2002 | O'Shea et al. |
| 2002/0074764 A1 | | 6/2002 | Allen et al. |

* cited by examiner

*Primary Examiner*—Christopher P. Ellis
*Assistant Examiner*—G B Klebe
(74) *Attorney, Agent, or Firm*—Bennett Jones LLP (57) ABSTRACT

A passenger carrier frame of the invention includes a lower frame member, a folding frame member, a back frame member and a frame folding control. These frame members are pivotally connected adjacent their ends to form a triangular arrangement in side view. The pivotal connections permit the frame to be folded and the frame folding control acts at a selected one of the pivotal connections to drive and lock pivotal rotation at that pivotal connection.

34 Claims, 6 Drawing Sheets

PASSENGER CARRIER FRAME

REFERENCE TO RELATED APPLICATIONS

This application claims priority under 35 USC 119 based on provisional patent application 60/380,268, filed May 15, 2002.

BACKGROUND OF INVENTION

The present invention relates to a passenger carrier frame and, in particular, a foldable frame for a passenger carrier such as a stroller, a jogger or a trailer, as for a bicycle or hiker.

In recent years, consumers with active lifestyles have sought passenger carriers that are rugged and versatile. Passenger carriers such as strollers or trailers, such as for towing behind a bicycle or by a hiker, must be foldable for transport and storage, while being easy to unfold.

Since many passenger carriers have frames that require complicated alignment and pinning of frame components, a frame is needed that is durable and foldable but easy to manipulate.

SUMMARY OF INVENTION

A foldable passenger carrier frame has been invented that is durable and easy to fold for storage and transport, but can be unfolded readily for use.

In accordance with a broad aspect of the present invention, there is provided a passenger carrier frame comprising: a first frame member; a second frame member pivotally connected to the first frame member; a folding frame member including a first pivotal connection to the first frame member, a second pivotal connection to the second frame member and a joint positioned between the first pivotal connection and the second pivotal connection and a frame folding control connected between the second frame member and the folding frame member to control pivotal movement about the second pivotal connection, the frame folding control being lockable to fix the frame members against pivotal movement about the second pivotal connection and unlockable to permit pivotal rotation at the second pivotal connection such that the second frame member and the folding frame member can pivot about the second pivotal connection and the folding frame member can collapse about the joint.

For ease of handling, the frame folding control can be positioned on an upper portion of the frame. Thus, in accordance with a broad aspect of the present invention, there is provided a passenger carrier frame comprising: a first frame member forming a base of the passenger carrier; a second frame member pivotally connected to the lower frame member and extending upwardly therefrom; a folding frame member including an upper end, a lower end and a joint therebetween about which the folding frame member can be folded, the folding frame member being pivotally connected adjacent its lower end to the first frame member; an upper frame pivotal connection adjacent the upper end of the folding frame member, the upper frame pivotal connection providing a pivotally moveable connection between the folding frame member and the second frame member; and a frame folding control connected between the folding frame member and the second frame member to control pivotal movement about the upper frame pivotal connection, the frame folding control being lockable to fix the upper frame pivotal connection against pivotal movement and unlockable to permit pivotal rotation at the upper frame pivotal connection such that the folding frame member and the second frame member can pivot about the upper frame pivotal connection and the folding frame member can collapse about the joint.

The frame folding control can be selected to cause the folding frame member to collapse inwardly about the joint toward the first frame member. This causes the second frame member to fold down to overlie the first frame member with the folding frame member disposed therebetween.

In one embodiment, the frame folding control is a folding link including a first link portion pivotally fixed to the second frame member and a second link portion pivotally fixed to the folding frame member and a link pivotal connection between the first link portion and the second link portion, the folding link being lockable by locking the link pivotal connection against pivotal movement.

In one such embodiment, the first link portion is formed as a lever including a pivotal connection to the second frame member and a handle at an end opposite the pivotal connection with the link pivotal connection fixed therebetween and the frame folding control is lockable by means of a releasable latch between the lever and the second frame member.

The frame can be formed to accommodate a handlebar for construction of a stroller. In one embodiment, the handlebar is connectable to the lever of the frame folding control.

In an embodiment selected for ease of handling and aerodynamics, the second frame member forms the upper rear portion of the frame, while the folding frame member is positioned forwardly thereof.

The frame, in one embodiment, is formed of elongate members, such as tubes, rods or bars (which together will be referred to herein as tubes) wherein, for example, the folding frame member are formed of a pair of side tubes with a joint correspondingly positioned on each to permit folding thereof. A cross member can be provided between the pair of side tubes. It is advantageous that any cross members are positioned adjacent the tube ends, for example within the end 25% of the full tube length. This provides a maximum open area on the frame to reduce obstructions for access to the passenger compartment defined between the first second and folding frame members.

The frame can include means supporting the attachment of transport means.

BRIEF DESCRIPTION OF DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DETAILED DESCRIPTION

Figure 1:
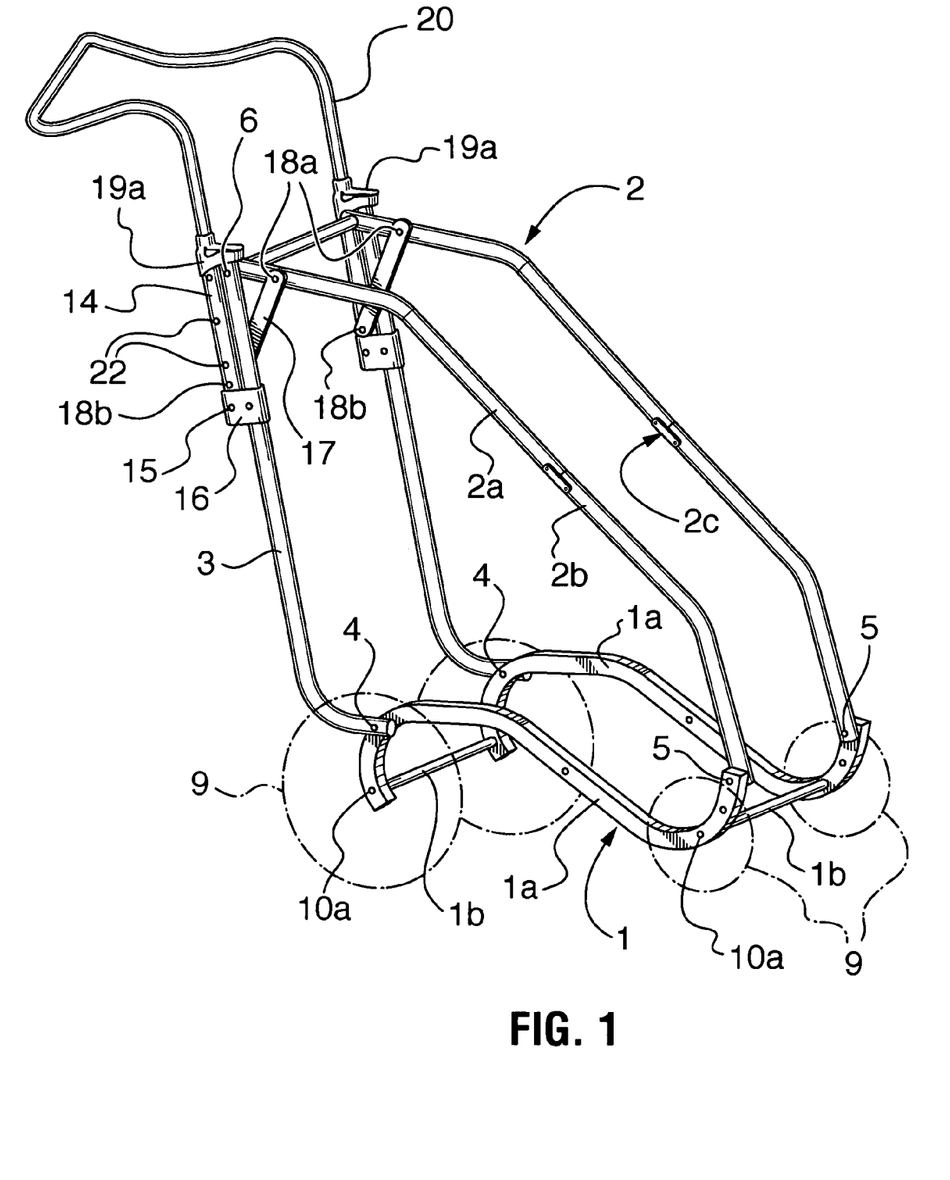
FIG. 1 is a perspective view of a frame according to the present invention in an upright configuration for use. The illustrated frame is fitted with a handlebar for use in a pushable frame such as a stroller or a jogger.
Figure 2:
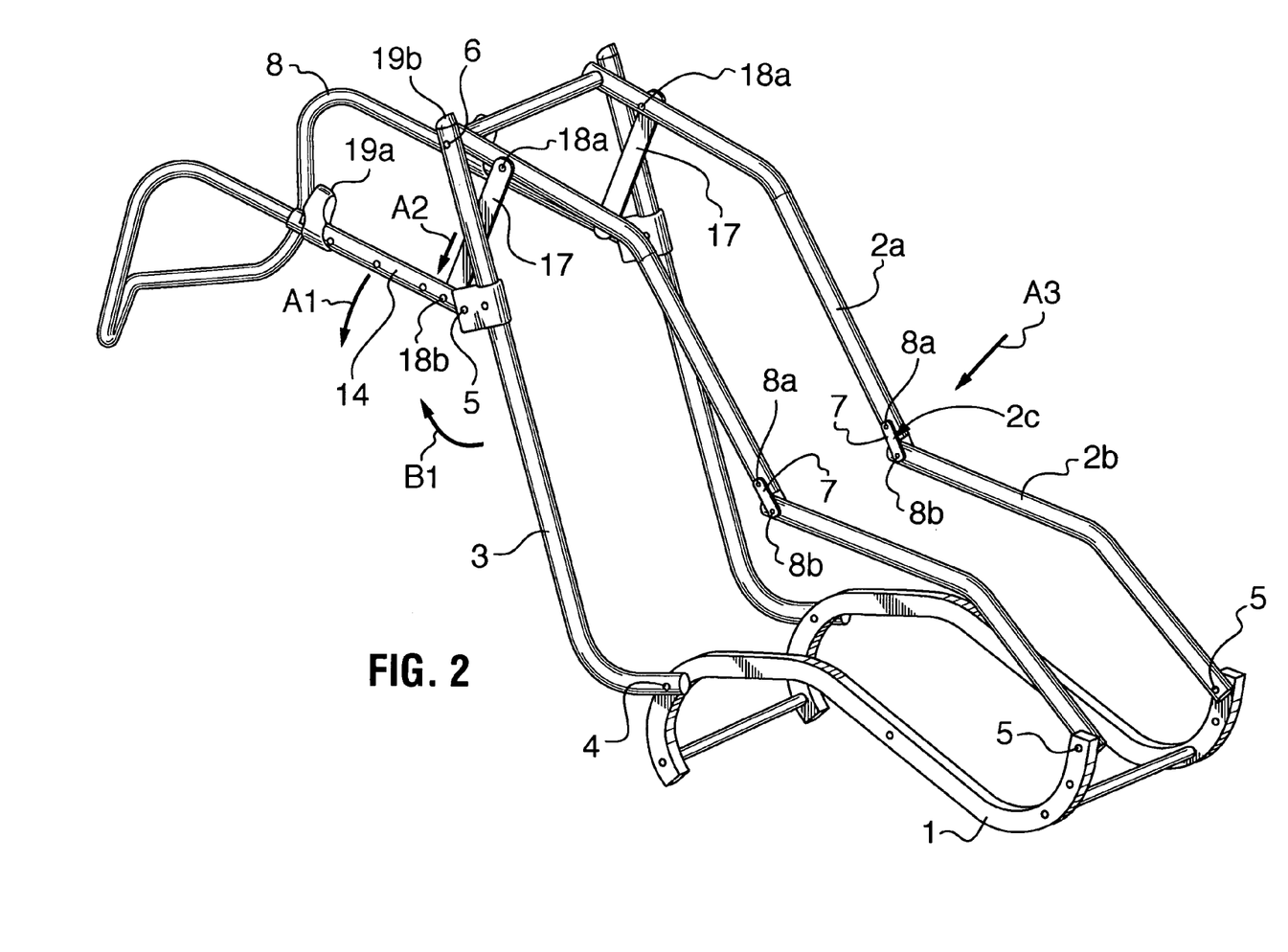
FIG. 2 is a perspective view of the frame of FIG. 1 in the initial stages of folding. The frame is shown with the wheels removed in order to facilitate understanding.
Figure 3:
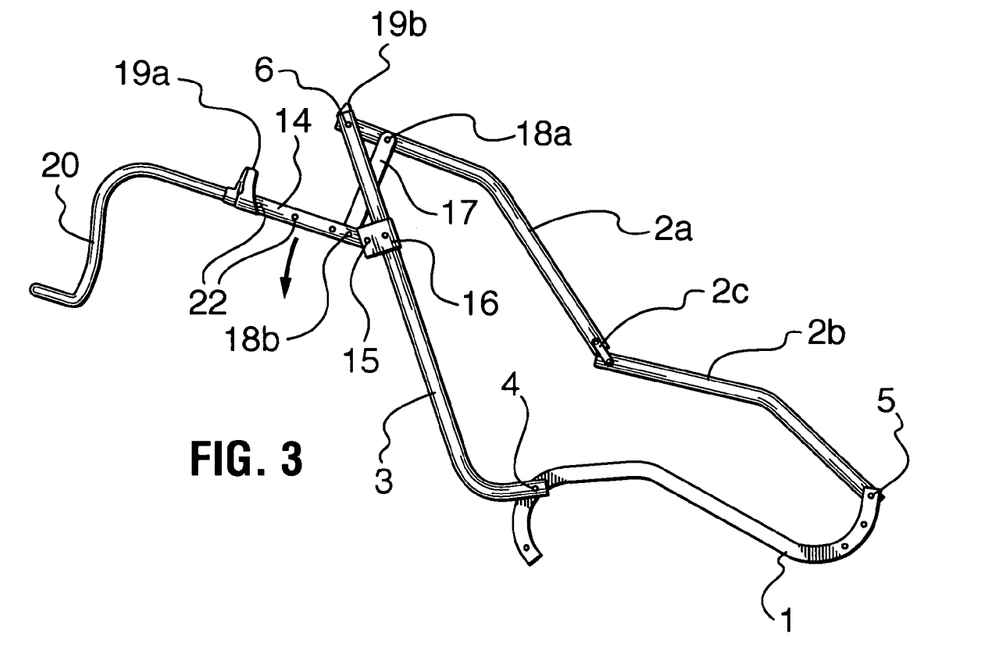
FIG. 3 is a side elevation of the frame of FIG. 2.
Figure 4:
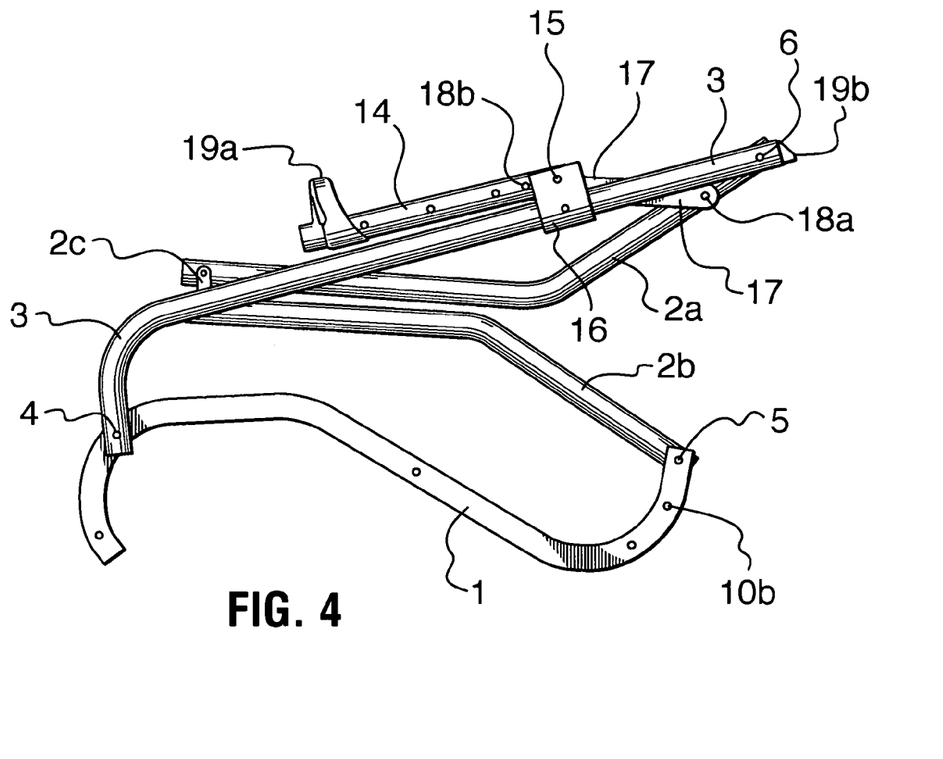
FIG. 4 is a side elevation of the frame of FIG. 1, in a folded configuration for storage or transport. The frame is illustrated with the handlebar removed.
Figure 5:
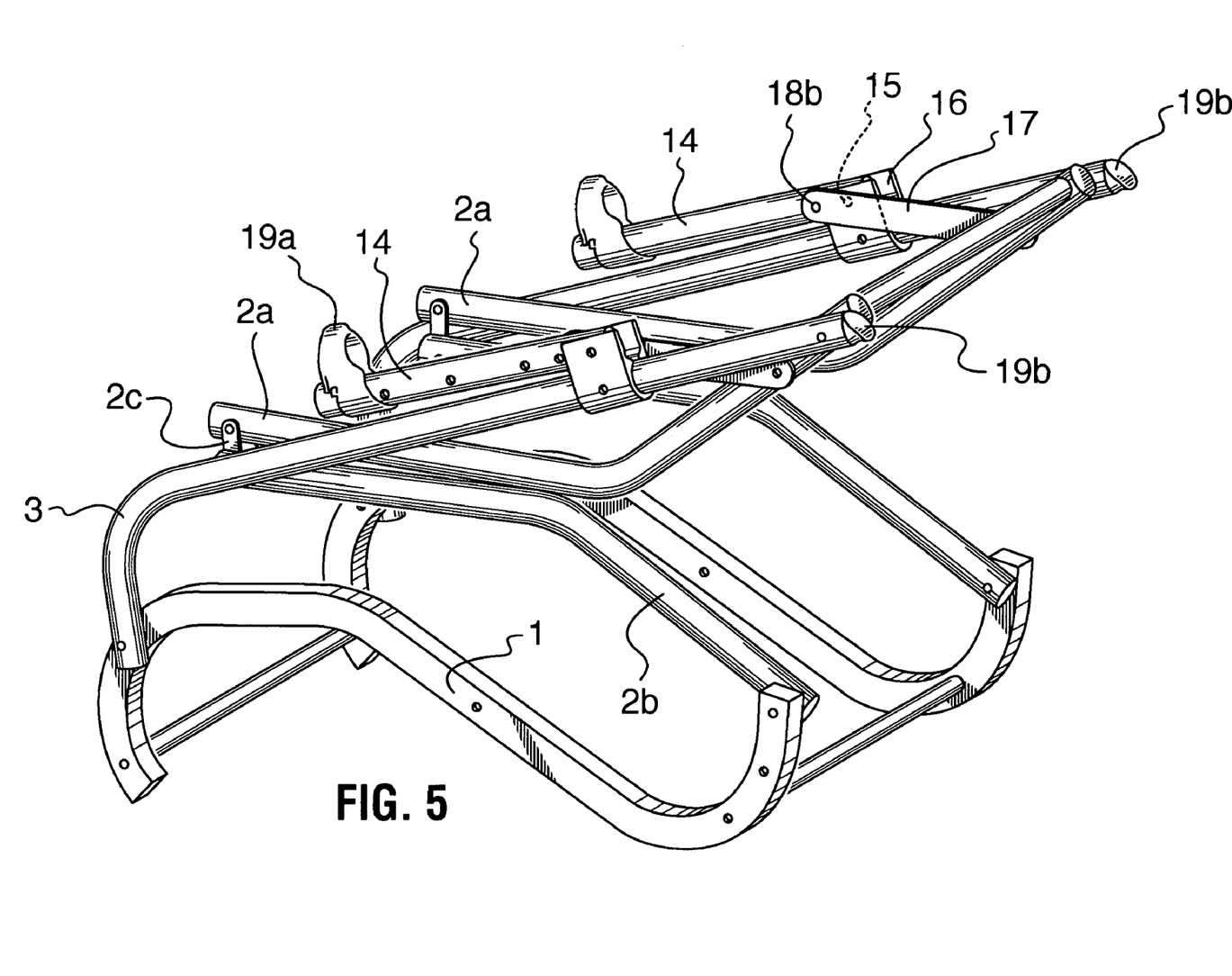
FIG. 5 is a perspective view of the frame of FIG. 4.

Referring to FIGS. 1 to 5, a passenger carrier frame according to the present invention is shown. The frame is useful for various passenger carrier configurations such as, for example, a stroller, a bicycle or hiker trailer, a jogger, a wheel chair, etc. and the illustrated frame is convertible between various of these forms. In FIGS. 1 to 3, the frame is shown fitted with a handlebar such that it is suitable for incorporation into a stroller or a jogger, which is moved by pushing on the handlebar. The frame can be formed specifically without a handlebar fitting capability, and could resemble that frame of FIGS. 4 and 5. Such a frame, for example, would be useful for incorporation into a trailer.

The frame of the illustrated embodiments includes a lower frame member 1, a folding frame member 2 and a back frame member 3. These frame members are pivotally connected adjacent their ends to form a triangular arrangement in side view. In particular, back frame member 3 is pivotally connected by pins 4 to lower frame member 1, folding frame member 2 is pivotally connected by pins 5 to lower frame member 1 and back frame member and folding frame member are pivotally connected by pins 6.

Folding frame member 2 includes two sections 2a, 2b attached through a joint 2c. When released to act, joint 2c allows the upper section 2a of the folding frame member to rotate relative to the lower part 2b.

The pivotal connections provided through pins 4, 5, 6 and joint 2c maintain the frame members in connected form and are arranged to act in parallel axes so that rotation can occur about all of the connections to permit folding of the frame.

The pivotal movement at pins 4, 5, 6 and joint 2c can be provided through various forms, such as pins, bolts, hinges, flexible inserts, etc. However, the pins and joints should be durable and able to support the weight of the frame and folding substantially without shearing and failing immediately. Folding, to at least some degree, can be permitted through joint 2c in various configurations (i.e. a direct pinning or bolting, a ball joint, a flexible polymeric insert, a hinge, etc.) and at various positions along the length of the folding frame member. However, joint 2c is preferably formed to permit a 180° range of movement between sections 2a and 2b, as this permits a very compact folding arrangement. In the illustrated embodiment, the joint is formed by links 7 connected at one end by pins 8a to section 2a and at the other end by pins 8b to sections 2b. Note as well that the joint can be formed at a number of positions along frame member 2, (i.e. in the middle 80% of the length) while still permitting folding to some degree. However, positioning the joint substantially centrally (i.e. in the middle 20% of the length) between the connections at pins 5 and 6 provides a convenient and compact folding arrangement.

To be effective for passenger carrying, the frame will eventually need to be fitted with transport means such as, for example, four wheels, shown in phantom at 9, other numbers of wheels, skis or towing hitches. The frame can, therefore, be fitted with apertures 10a (FIG. 1) or 10b (FIG. 4) for accepting the mounting of transport components, brackets, connectors, or other means for supporting attachment of the transport means.

Also to be effective for passenger carrying the frame will eventually need to support a seat into which a passenger can be secured. However, to facilitate illustration the seat has not been shown. It is to be understood that the seat can be configured in various ways such as, for example, by slinging between various of the upper frame members or by forming the seat into the lower frame member. When incorporated into a passenger carrier the frame may also support an outer covering, storage compartments, cowlings, etc.

The passenger carrier frame further includes a frame folding control including a lever 14 and a link 17. Lever 14 has a fulcrum at pivot connection 15 to a clevis 16 that is rigidly connected to back frame member 3. Link 17 is pivotally connected at each end by pins 18a, 18b to extend between lever 14 and folding frame member 2.

A latching mechanism including a bracket 19a and a catch 19b releasably locks lever 14 against rotation about its fulcrum.

Lever 14 can be formed in various ways depending on the end use of the frame. For example, in the embodiment of FIG. 1, lever 14 is formed on each side as a sleeve to accept insertion of a stroller handlebar 20. Lever 14 can include spaced apertures 22 for cooperation with spring-loaded detent pins on the handlebar, for selection of handlebar height. Handlebar 20 facilitates locating and grasping lever 14. If the frame was formed specifically for use as a trailer, it might resemble the embodiment of FIG. 4, wherein no handlebar was provided and the lever was formed as separate parts on each side. A cross member could be provided between the separate lever parts, if desired. The frame may also be useful in a passenger carrier that is convertible between a trailer, a stroller, a jogger, etc.

The frame folding control drives the folding and unfolding of the frame. In particular, as lever 14 is rotated downwards about its fulcrum, pivot connection 15, as shown by arrow A1, it pulls link 17 downwards (arrow A2), thereby pulling on upper section 2a of the folding frame member. This causes the folding frame member to fold about joint 2a (arrow A3), which results in the rest of the frame folding simultaneously (FIGS. 2, 3, 4 and 5). When folded, the frame forms a generally cube-shaped arrangement, which is conveniently stored. In particular, preferably folding frame member 2 is formed to collapse inwardly, toward the other frame members 1, 3 so that the folded frame does not become overly long. In this configuration, the folding frame member folds between the back frame member and the lower frame member, which the back frame member overlies the lower frame member. In addition, the positioning of handlebar 20 on lever permits the handlebar to be maintained on the frame during storage, it being formed to tuck in around the frame.

To upright the frame, the reverse action is carried out. In particular, lever 14 is rotated upwards about its fulcrum toward pins 6, as shown by arrow B1, it pushes link 17 against upper section 2a of the folding frame member. This causes the folding frame member to be pushed out, which results in the frame uprighting simultaneously by pivoting about pins 4, 5, 6 and joint 2c until lever 14 locks against back frame member 3.

As will be appreciated, for proper folding and solid upright configuration, the length of link 17 and sections 2a, 2b and the positioning of pivotal connections 18a, 18b and joint 2c, must be selected to correspond so that when lever is in a locked configuration, the folding frame member is unfolded to it upright configuration.

Other arrangements can be used in place of the illustrated lever and link arrangement. For example, lever can be oriented to rotate downwardly to upright the frame and upwardly to fold the frame. However, it is advantageous to require upward rotation of the lever since this corresponds with the normal unfolding motion of both the frame and the operator. In particular, the operator can position the folded frame on a support surface and simply pull up on the lever to upright the frame. This is particularly advantageous, for example, when the frame is being lifted out of a storage compartment, such as of a vehicle. In particular, in the same motion of lifting the frame from the storage compartment, the passenger carrier frame can be unfolded, ready for use.

As another example, the lever and link arrangement could be positioned about the other two frame pivotal connections at pins 4 or 5. However, the illustrated positioning in the upper rear corner facilitates handling, since it is positioned within easy reach of the operator, especially when the frame is being used in the stroller configuration. As such, when the frame is incorporated in a passenger carrier and in use with an operator gripping handlebar, the operator can drive the entire folding operation without their moving about the frame or bending over.

As another example, lever 14 can be pinned directly to back frame member to rotate about the fulcrum in various orientations. However, the clevis arrangement permits the lever to extend adjacent and substantially parallel with the back frame member and out of the way of the rotation of folding frame member about connection at pins 6. In addition, during normal operation as a stroller, force is most often directed through lever 14 toward the stroller front end, forcing the lever into latching engagement.

It should also be understood that only one lever and link need be provided to drive the folding of the frame about one of its pivotal connections. However, due to its tubular construction and symmetrical form, the frame is preferably, for frame rigidity and ease of operation, substantially duplicated on each side of the frame. This is also true for the latching mechanism.

While the frame members each act as unitary parts, it is to be understood that the frame members can be formed, as shown, of a plurality of rigidly interconnected sections. For example, in the illustrated embodiment, the lower frame member is formed of a pair of elongate side members 1a that extend generally from front to back and a pair of elongate cross members 1b that rigidly connect between side members 1a. Members 1a and 1b together form lower frame member. Back frame member 3 includes a pair of elongate members 3a, 3b. Folding frame member 2 is formed of a pair of elongate side members each having a joint 2c positioned therealong at corresponding locations that permit folding of the overall frame member 2. Side members 2' and 2" extend upwardly from front to back and a cross member 2' rigidly connects therebetween at the upper end.

The frame of the present invention permits easy folding but also provides significant open area for access to the passenger compartment and few obstructions to passenger viewing areas. In particular, the frame, when incorporated into a passenger carrier, generally defines a passenger compartment wherein the folding frame member forms the upper extent, the back frame member forms the rear extent and the lower frame member forms the base. Thus, the present frame is advantageous since it requires few cross members for holding the frame upright and for driving folding. Furthermore, any such required cross members, such as links 17 or cross members 2', can be restricted to positioning adjacent the frame corners out of the way of the main open areas. For example, cross members, such as links 17 and cross member 2', can be positioned adjacent the ends of their frame member for example within the end 25% of their frame member length.

The various elongate frame members can be formed of various rod, bar or tubular materials and in various shapes. While, the frame members are generally formed of tubing formed of, for example, aluminium or steel tubing, it is to be noted however, for example with reference to U.S. Pat. No. 5,577,746 issued to the present assignee, that the frame members could be formed of polymeric shells or in other ways. The frame members can be curved or straight to accommodate appearance, space and other considerations. The frame members and other components can be connected together by pinning, riveting, bolting, welding, adhesives, inserts or other durable means. Pivotal connections can be provided by use of rivets, bolts, pins or other fasteners.

The latching mechanism mounts between the lever and the back frame member and can be any mechanism that releasably latches these parts together. Preferably, the latching mechanism is selected to latch automatically once the parts are brought together. For example, one suitable arrangement is shown in FIGS. 6 and 7 and another suitable arrangement is shown in FIGS. 8 to 10.

Figure 6:
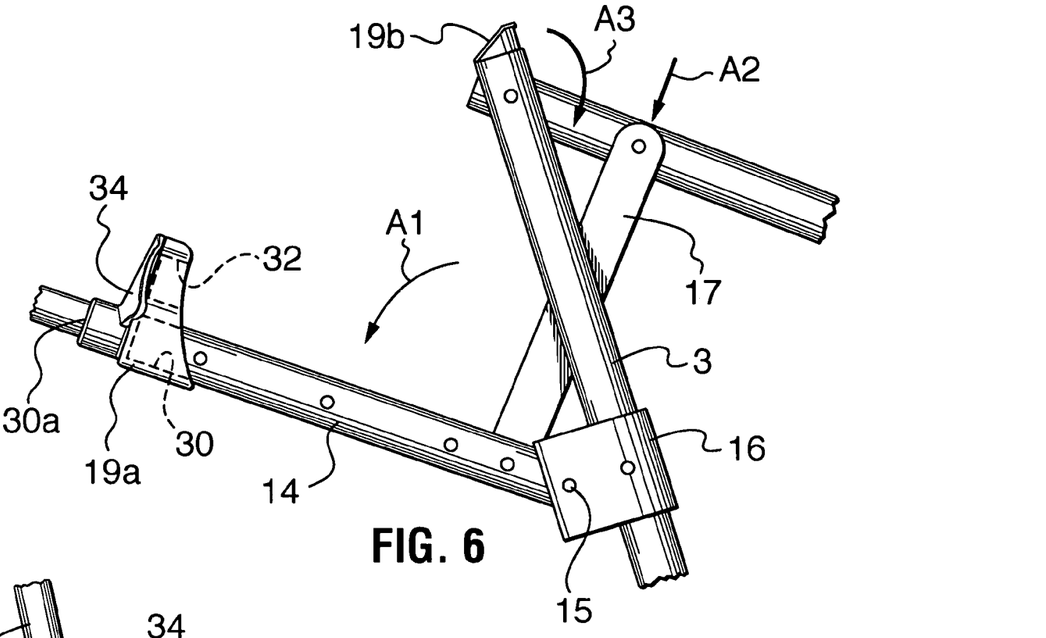
FIG. 6 is an enlarged side elevation of the latching system included in the frame of FIG. 1, the latching system being in the unlatched position.
Figure 7:
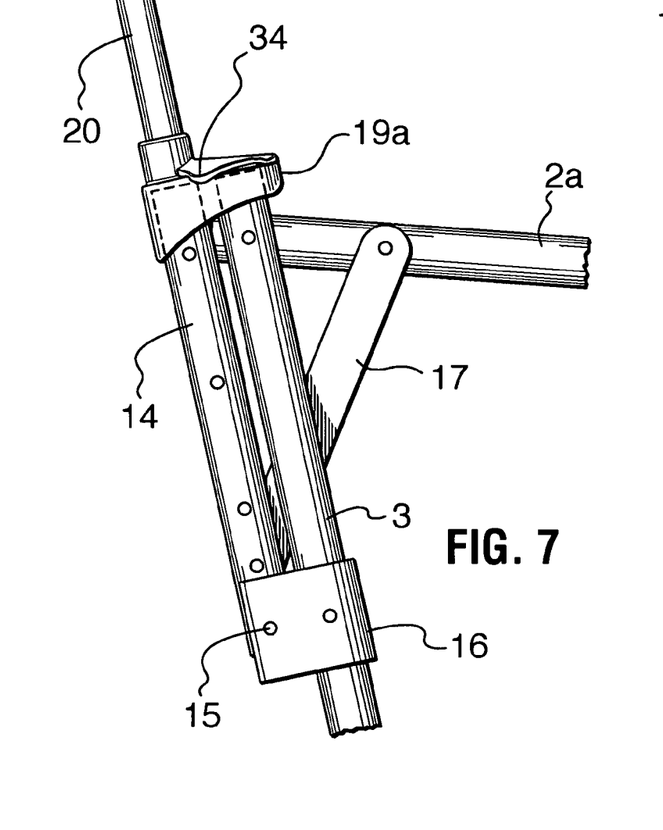
FIG. 7 is an enlarged side elevation of the latching system of FIG. 6, in the latched position.
Figures 8, 9, 10:
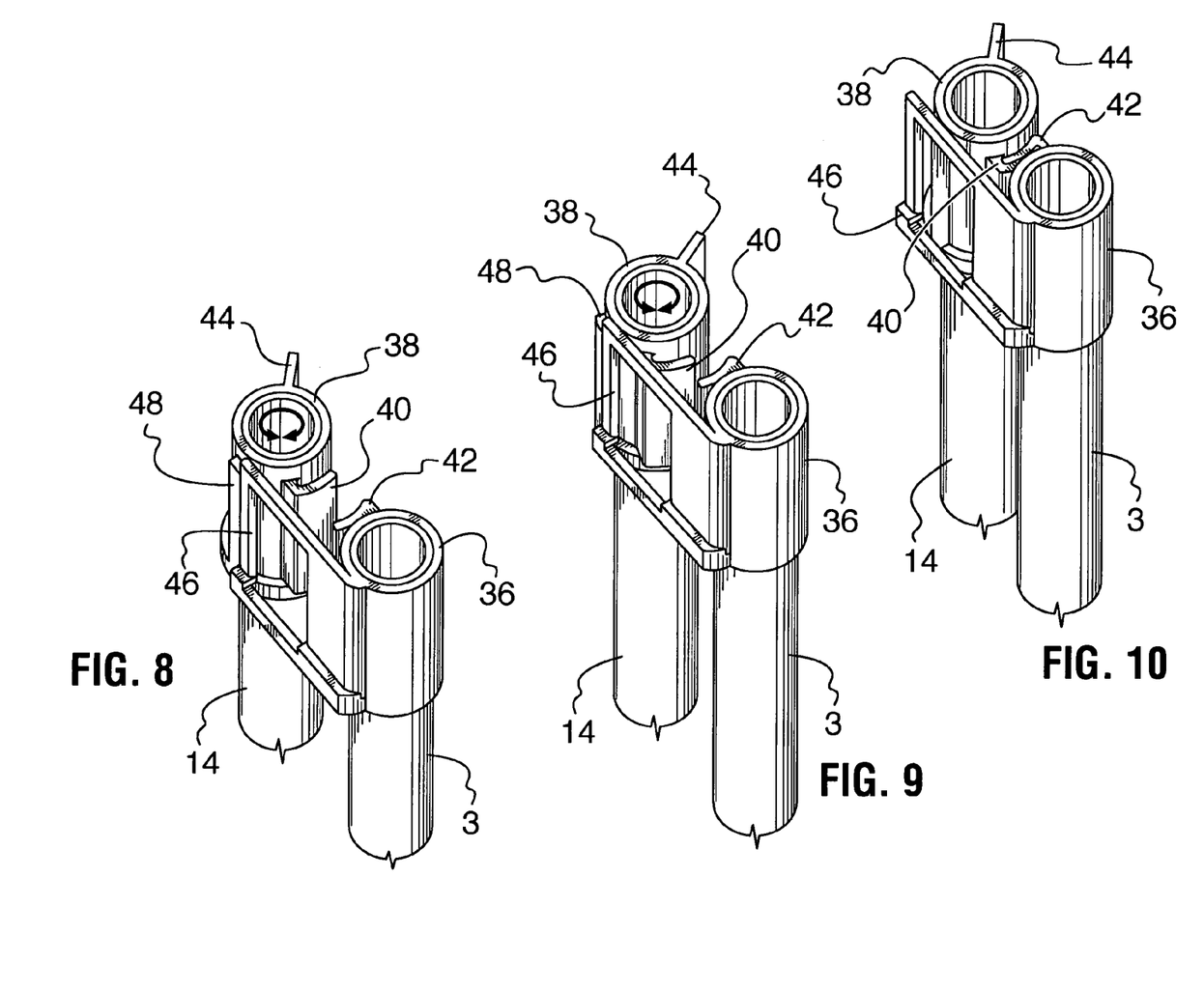
FIG. 8 is an enlarged perspective view of another latching system useful in the present invention, the latching system being in the unlatched position.
FIG. 9 is a view corresponding to FIG. 8 with the latching system in a configuration approaching latching.
FIG. 10 is a view corresponding to FIGS. 8 and 9 with the latching system in a latched position.

First with reference to FIGS. 6 and 7, a latching system useful in the present invention includes a back frame cap defining an inclined catch 19b mounted at the top of back frame member 3 and a latching bracket 19a that mounts at the top end of the lever. Bracket 19a includes an aperture 30 that sleeves around the top of lever 14. In the stroller configuration, the upper surface 30a of the bracket is open allowing for the insertion of the handlebar 20. When intended for use as a trailer, the upper surface can be capped. Bracket 19a further includes a cavity 32 sized to fit over and engage catch 19b. The latching bracket 19a is spring loaded to bias the bracket axially against the end of the lever. When driven against catch 19b, the cavity of the latching bracket captures the back frame cap 19b (FIG. 7), preventing the lever from moving and, thereby, preventing the frame from folding.

To fold the frame, the latching bracket is lifted by its tabs 34 until it completely disengages from the catch and then the lever can be is rotated downwards to fold the frame (FIG. 6).

To upright the frame, lever 14 is lifted upwards to rotate about its fulcrum.

When the latching bracket 19a comes in contact with the catch 19b, the bracket slides upward on lever 14, as forced by the inclined surface, until the catch aligns with cavity 32 in the latching bracket. At that instance, the spring in the latching bracket pulls the bracket down to capture the catch 19b in the cavity and to secure the lever to the back frame member, thereby locking the frame in its upright position.

Referring to FIGS. 8 to 10, another latching mechanism is shown. The latching mechanism includes two brackets: a back frame bracket 36 that is fixed to back frame member and bracket 38 that is capable of rotating around the axis of lever 14. Bracket 38 is fitted with a torsional spring that permits rotation of the bracket but automatically returns it to its original position once force is removed. Both brackets have latching features 40, 42 that lock the two parts to each other, preventing the frame from folding.

To fold the frame, the bracket on lever 14 is manually twisted or rotated open by pushing on tab 44 until its latch 40 completely disengages from latch 42 on back frame bracket 36, and then the lever is moved downwards to fold the frame.

To upright the frame, the lever is lifted upwards. When the two brackets 36, 38 come in contact with each other, bracket 38 is automatically twisted or rotated open by a flange 46 on the back frame bracket pushing against a rib 48 on bracket 38. Once the latching features on the two brackets clear each other, the torsional spring in the bracket 38 twists or rotates the bracket back closed to secure the latching features together, thereby locking the frame in its upright position.

The latching mechanism components, clevis members and other parts can be formed of durable materials such as polymers or metals, as will be appreciated.

Although preferred embodiments of the present invention have been described in some detail hereinabove, those skilled in the art will recognise that various substitutions and modifications may be made to the invention without departing from the scope and spirit of the appended claims.

What is claimed is:

1. A passenger carrier frame comprising: a lower frame member; a folding frame member including a folding joint; an upper frame member, the frame members having pivotal connections to connect them adjacent their ends to form a triangular arrangement in side view and the pivotal connections and the folding joint together permitting the frame to be folded; and a frame folding control acting at a selected one of the pivotal connections to drive rotation at that pivotal connection to cause folding and unfolding of the frame and being actuatable to lock against rotation at that pivotal connection and the frame folding control including a folding link including a first link portion pivotally fixed to the upper frame member and a second link portion pivotally fixed to the folding frame member and a link pivotal connection between the first link portion and the second link portion, the folding link being actuatable to lock by locking the link pivotal connection against pivotal movement.

2. The passenger carrier frame of claim 1 wherein the frame folding control drives the folding frame member to collapse inwardly about the joint toward the lower frame member, such that the upper frame member and the lower frame member fold together with the folding frame member disposed therebetween.

3. The passenger carrier frame of claim 1 wherein the second link portion is pivotally fixed to the folding frame member within the end 25% of the folding frame member length.

4. The passenger carrier frame of claim 1 further comprising means supporting the attachment of transport means.

5. The passenger carrier frame of claim 1 wherein the first link portion is formed as a lever including an end extending beyond the pivotal connection, the frame folding control being actuatable to lock by means of a releasable latch between the lever and the upper frame member.

6. The passenger carrier frame of claim 5 wherein the frame is formed to accommodate a handlebar for construction of a pushable carrier and the handlebar is connectable to the lever of the frame folding control.

7. The passenger carrier frame of claim 5 wherein the frame folding control drives rotation at the selected pivotal connection to cause unfolding of the frame by rotating the lever toward the selected pivotal connection.

8. A passenger carrier frame comprising: a first frame member; a second frame member pivotally connected to the first frame member; a folding frame member including a first pivotal connection to the first frame member, a second pivotal connection to the second frame member and a joint positioned between the first pivotal connection and the second pivotal connection and a frame folding control connected between the second frame member and the folding frame member to control pivotal movement about the second pivotal connection, the frame folding control being lockable to fix the frame members against pivotal movement about the second pivotal connection and unlockable to permit pivotal rotation at the second pivotal connection such that the second frame member and the folding frame member can pivot about the second pivotal connection and the folding frame member can collapse about the joint and the frame folding control driving the folding frame member to collapse inwardly about the joint toward the first frame member, such that the second frame member and the first frame member fold together with the folding frame member disposed therebetween.

9. The passenger carrier frame of claim 8 further comprising means supporting the attachment of transport means.

10. The passenger carrier frame of claim 8 wherein the frame folding control includes a folding link including a first link portion pivotafly fixed to the second frame member and a second link portion pivotally fixed to the folding frame member and a link pivotal connection between the first link portion and the second link portion, the folding link being lockable by locking the link pivotal connection against pivotal movement.

11. The passenger carrier frame of claim 10 wherein the first link portion is formed as a lever including a pivotal connection to the second frame member and a handle at an end opposite the pivotal connection with the link pivotal connection fixed therebetween, the frame folding control being lockable by means of a releasable latch between the lever and the second frame member.

12. The passenger carrier frame of claim 11 wherein the frame is formed to accommodate a handlebar for construction of a pushable carrier and the handlebar is connectable to the lever of the frame folding control.

13. The passenger carrier frame of claim 11 wherein the frame folding control is unlockable by rotating the lever toward the first frame member.

14. The passenger carrier frame of claim 10 wherein the second link portion is pivotally fixed to the folding frame member within the end 25% of the folding frame member length.

15. A passenger carrier frame comprising: a first frame member; a second frame member pivotally connected to the first frame member; a folding frame member including a first pivotal connection to the first frame member, a second pivotal connection to the second frame member and a joint positioned between the first pivotal connection and the second pivotal connection and a frame folding control connected between the second frame member and the folding frame member to control pivotal movement about the second pivotal connection, the frame folding control being lockable to fix the frame members against pivotal movement about the second pivotal connection and unlockable to permit pivotal rotation at the second pivotal connection such that the second frame member and the folding frame member can pivot about the second pivotal connection and the folding frame member can collapse about the joint and the frame folding control including a folding link including a first link portion pivotally fixed to the second frame member and a second link portion pivotally fixed to the folding frame member and a link pivotal connection between the first link portion and the second link portion, the folding link being lockable by locking the link pivotal connection against pivotal movement.

16. The passenger carrier frame of claim 1 wherein the frame folding control drives the folding frame member to collapse inwardly about the joint toward the first frame member, such that the second frame member and the first frame member fold together with the folding frame member disposed therebetween.

17. The passenger carrier frame of claim 1 wherein the second link portion is pivotally fixed to the folding frame member within the end 25% of the folding frame member length.

18. The passenger carrier frame of claim 1 further comprising means supporting the attachment of transport means.

19. The passenger carrier frame of claim 1 wherein the first link portion is formed as a lever including a pivotal connection to the second frame member and a handle at an end opposite the pivotal connection with the link pivotal connection fixed therebetween, the frame folding control being lockable by means of a releasable latch between the lever and the second frame member.

20. The passenger carrier frame of claim 19 wherein the frame is formed to accommodate a handlebar for construction of a pushable carrier and the handlebar is connectable to the lever of the frame folding control.

21. A passenger carrier frame comprising: a first frame member forming a base of the passenger carrier a second frame member pivotally connected to the first frame member and extending upwardly therefrom; a folding frame member including an upper end, a lower end and a joint therebetween about which the folding frame member cart be folded, the folding frame member being pivotally connected adjacent its lower end to the first frame member; an upper frame pivotal connection adjacent the upper end of the folding frame member, the upper frame pivotal connection providing a pivotally moveable connection between the folding frame member and the second frame member; and a frame folding control connected between the folding frame member and the secoid frame member to control pivotal movement about the upper frame pivotal connection, the frame folding control being lockable to fix the upper frame pivotal connection against pivotal movement and unlockable to permit pivotal rotation at the upper frame pivotal connection such that the folding frame member and the second frame member can pivot about the upper frame pivotal connection and the folding frame member can collapse about the joint, and the frame folding control including a folding link including a first link portion pivotally fixed to the second frame member and a second link portion pivotally fixed to the folding frame member and a link pivotal connection between the first link portion and the second link portion, the folding link being lockable by locking the link pivotal connection against pivotal movement.

22. The passenger carrier frame of claim 21 wherein the second frame member forms the upper rear portion of the frame and the folding frame member is positioned forwardly thereof.

23. The passenger carrier frame of claim 21 wherein the frame folding control drives the folding frame member to collapse inwardly about the joint toward the first frame member, such that the second frame member and the first frame member fold together with the folding frame member disposed therebetween.

24. The passenger carrier frame of claim 21 wherein the second link portion is pivotally fixed to the folding frame member within the end 25% of the folding frame member length.

25. The passenger carrier frame of claim 21 further comprising means supporting the attachment of transport means.

26. The passenger carrier frame of claim 21 wherein the first link portion is formed as a lever including a pivotal connection to the second frame member and an end opposite the pivotal connection with the link pivotal connection positioned therebetween, the frame folding control being lockable by means of a releasable latch between the lever and the second frame member.

27. The passenger carrier frame of claim 26 wherein the frame is formed to accommodate a handlebar for construction of a pushable carrier and the handlebar is connectable to the lever of the frame folding control.

28. The passenger carrier frame of claim 26 wherein the frame folding control is unlockable by rotating the lever toward the first frame member.

29. A passenger carrier frame comprising: a first frame member forming a base of the passenger carrier; a second frame member pivotally connected to the first frame member and extending upwardly therefrom; a folding frame member including an upper end, a lower end and a joint therebetween about which the folding frame member can be folded, the folding frame member being pivotally connected adjacent its lower end to the first frame member; an upper frame pivotal connection adjacent the upper end of the folding frame member, the upper frame pivotal connection providing a pivotally moveable connection between the folding frame member and the second frame member; and a frame folding control connected between the folding frame member and the second frame member to control pivotal movement about the upper frame pivotal connection, the frame folding control being lockable to fix the upper frame pivotal connection against pivotal movement and unlockable to permit pivotal rotation at the upper frame pivotal connection such that the folding frame member and the second frame member can pivot about the upper frame pivotal connection and the folding frame member can collapse about the joint, the frame folding control driving the folding frame member to collapse inwardly about the joint toward the first frame member, such that the second frame member and the first frame memoer fold together with the folding frame member disposed therebetween.

30. The passenger carrier frame of claim 29 wherein the second frame member forms the upper rear portion of the frame and the folding frame member is positioned forwardly thereof.

31. The passenger carrier frame of claim 29 further comprising transport means attached thereto.

32. The passenger carrier frame of claim 29 wherein the frame folding control includes a folding link including a first link portion pivotally fixed to the second frame member and a second link portion pivotally fixed to the folding frame member and a link pivotal connection between the first link portion and the second link portion, the folding link being lockable by locking the link pivotal connection against pivotal movement.

33. A passenger carrier frame comprising: a lower frame member; a folding frame member including a folding joint; an upper frame member, the frame members having pivotal connections to connect them adjacent their ends to form a triangular arrangement in side view and the pivotal connections and the folding joint together permitting the frame to be folded; and a frame folding control acting at a selected one of the pivotal connections to drive rotation at that pivotal connection to cause folding and unfolding of the frame and actuatable to lock against rotation at that pivotal connection and the frame folding control driving the folding frame member to collapse inwardly about the joint toward the lower frame member, such that the upper frame member and the lower frame member fold together with the folding frame member disposed therebetween, the frame folding control including a folding link including a first link portion pivotally fixed to the upper frame member and a second link portion pivotally fixed to the folding frame member and a link pivotal connection between the first link portion and the second link portion, the folding link being actuatable to lock by locking the link pivotal connection against pivotal movement.

34. The passenger carrier frame of claim 33 further comprising means supporting the attachment of transport means.

* * * * *